(12) United States Patent
Rodriguez et al.

(10) Patent No.: US 12,505,324 B1
(45) Date of Patent: Dec. 23, 2025

(54) ILLUMINATION SYSTEM TO IMPROVE SCANNER PERFORMANCE IN DARK ENVIRONMENTS

(71) Applicant: Zebra Technologies Corporation, Lincolnshire, IL (US)

(72) Inventors: Miguel O. Rodriguez, Coram, NY (US); Igor Vinogradov, Oakdale, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/981,386

(22) Filed: Dec. 13, 2024

(51) Int. Cl.
*G06K 7/10* (2006.01)
*G06K 7/14* (2006.01)

(52) U.S. Cl.
CPC ....... *G06K 7/1417* (2013.01); *G06K 7/10732* (2013.01); *G06K 7/10881* (2013.01); *G06K 2007/10524* (2013.01)

(58) Field of Classification Search
CPC .......................... G06K 7/10881; G06K 7/1417
USPC .................................................... 235/462.11
See application file for complete search history.

(56) References Cited

U.S. PATENT DOCUMENTS 7,878,406 B2 * 2/2011 Pankow ............. G06K 7/10732
235/462.14

* cited by examiner

*Primary Examiner* — Toan C Ly
(74) *Attorney, Agent, or Firm* — Yuri Astvatsaturov (57) ABSTRACT

Systems and methods for improving illumination of an imaging system are disclosed. An example system includes a housing having a handgrip portion and an upper body portion, and an imaging module positioned within the upper body portion. The imaging module includes an imaging assembly having an imager. The imaging assembly has a field of view (FOV) with a central axis passing through a window in the upper body portion. The system further includes an aiming assembly configured to provide an aiming pattern in the field of view of the imaging assembly, and an illumination assembly with one or more illumination sources and an illumination optical element. The illumination assembly is configured to provide illumination to a central region of the FOV of the imaging assembly. The illumination optical element is configured to receive illumination from the illumination sources, and generate an illumination field in the FOV of the imaging assembly.

18 Claims, 8 Drawing Sheets

ILLUMINATION SYSTEM TO IMPROVE SCANNER PERFORMANCE IN DARK ENVIRONMENTS

BACKGROUND

Imaging devices, such as barcode readers, many include illumination sources to provide illumination for imaging or for performing decoding of a barcode. Successful and efficient decoding of barcodes requires specific lighting conditions that are dependent on multiple factor including types of barcodes, resolution requirements, environmental conditions, etc. As such, providing proper illumination can be a complex process and most barcode readers are not robust enough to provide illumination given these factors across a variety of applications and environments. Typically barcode readers that include illumination systems provide are limited in providing a single type of illumination such as a flash, or constant illumination to a field of view. New scanner technologies include more features like wireless charging, USB-C connections, wider fields-of-view, and increased sensor sizes. Such features consume more electrical power that limits the available current or electrical power for illumination and often degrades decode performance in low light and dark ambient settings.

The reduced scanning and decode performance due to low illumination can also increase the occurrence of double decodes at far distance due to dark images. As such, an object further from a barcode reader, or in a dark environment, may not be properly illuminated, and the barcode reader may not be able to properly capture images and decode a barcode of an object far away. Typically, illumination systems are limited in brightness by the number of illumination sources of a given system, which is not readily able to be increased due to hardware restraints. Additionally, the number of light sources may not further increase brightness for handheld systems as power considerations are also limiting in the amount of light that is capable of being provided by a system regardless of the number of light sources available.

Accordingly, there is a need for improvements to systems for improving scanner performance and illumination for scanners in dark environments or at distances away from a barcode reader.

SUMMARY

In an embodiment, the present invention is An imaging system, the imaging system including: an imaging assembly with one or more imaging sensors, the imaging assembly configured to capture images of one or more objects of an environment in a field of view of the imaging assembly, the one or more imaging sensors including a two-dimensional (2D) imager; an aiming assembly configured to provide an aiming pattern in the field of view of the imaging assembly; and an illumination assembly with one or more illumination sources and an illumination optical element configured to provide illumination to a central region of the field of view of the imaging assembly, the central region being between 30% to 60% of a cross-sectional area of the field-of-view, wherein the average illumination intensity inside of the central region is at least 20% greater than an average illumination intensity in the field-of-view outside of the central region, wherein the illumination optical element is configured to receive illumination from the one or more illumination sources and generate an illumination field in the field of view of the imaging assembly.

In variations of the current embodiment, the central region comprises a region of space around a central axis of the field of view, the central axis defining a center of the field of view along a plurality of cross-sections of the field of view, the cross-sections being orthogonal to the central axis.

In yet more variations of the current embodiment, the illumination field has an average illumination intensity in the central region that is less than 50% greater than an average illumination of the illumination field outside of the central region. In continued variations of the current embodiment, the illumination field the average light distribution in the central region is greater than 25% higher than the light distribution outside of the central region between 2 and 28 inches from the imaging system along the central axis. In examples, the central region may be between 45% and 55% of the cross-sectional area of the field-of-view along a working distance of the imaging assembly.

In further variations, the ratio of the average illumination intensity in the central region to the average illumination intensity in the field-of-view outside of the central region varies by less than 50% along a working distance of the imaging assembly.

In yet more variations of the current embodiment, the illumination optical element comprises at least one of a freeform lens, a collimator and a microlens array.

In some variations of the current embodiment, the imaging sensor comprises a two-dimensional imager.

In variations of the current embodiment, the aiming assembly is configured to provide the aiming pattern along the central axis of the field of view. In implementations, the aiming pattern is indicative of the central region.

In another embodiment, the present invention is a barcode reader. The barcode reader includes: a housing having a handgrip portion and an upper body portion; an imaging module positioned within the upper body portion, the imaging module including: an imaging assembly having an imager, the imaging assembly having a field of view with a central axis passing through a window in the upper body portion; an aiming assembly configured to provide an aiming pattern in the field of view of the imaging assembly; an illumination assembly with (i) one or more illumination sources and (ii) an illumination optical element, the illumination assembly configured to provide illumination to a central region of the field of view of the imaging assembly, wherein the illumination optical element is configured to receive illumination from the one or more illumination sources and generate an illumination field in the field of view of the imaging assembly.

In variations of the current embodiment, the central region comprises a region of space around a central axis of the field of view, the central axis defining a center of the field of view along a plurality of cross-sections of the field of view, the cross-sections being orthogonal to the central axis.

In more variations, the illumination field has an average illumination intensity in the central region that is at least 20% greater than an average illumination of the illumination field outside of the central region.

In yet more variations, the illumination field has an average illumination intensity in the central region that is less than 50% greater than an average illumination of the illumination field outside of the central region. In continued variations an average light distribution in the central region is greater than 25% higher than a light distribution outside of the central region between 2 and 28 inches from the imaging system along the central axis. In yet more variations, the illumination optical element comprises one or more of a freeform lens, a collimator, and a microlens array.

In further variations, the imaging sensor comprises a two-dimensional imager.

In additional variations the aiming assembly is configured to provide the aiming pattern along the central axis of the field of view. In implementations, the aiming pattern is indicative of the central region.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Imaging devices, such as a barcode scanner, may scan and image objects in various environments and under a wide variety of conditions. Handheld scanners often are used to scan items that are very close, within a few inches, and may also be used to scan objects further away, either a foot or more. Brightness of an environment, or illumination provided to a target object, is integral for performing efficient scanning and imaging. Insufficient light can result in erroneous scanning operations, or the inability to perform a barcode scan altogether. Additionally, handheld barcode readers and imaging devices have a portable power supply and therefore are limited in the illumination that is able to be provided via the device itself. As such, handheld devices are often not capable of imaging and performing barcode reading in a wide range of lighting conditions and environments. Continued improvements and additions to barcode readers require more power and electrical current to be provided to additional components (e.g., higher resolution scanners, greater frame rate imagers, wireless charging circuitry, faster processors, etc.), which reduces the available current and power for providing illumination. As such, illumination sources are limited, and may even be reduced, in the overall illumination that may be provided for capturing images for performing machine vision and decoding processes.

An example imaging device and method is provided that enables imaging devices to provide improved illumination for low light scenarios and environments, such as for low ambient light conditions, and for objects that may be further from an imager or scanner. The device includes an illumination assembly with illumination sources and freeform lens configured to provide greater illumination to a central region of a field-of-view (FOV) of the imaging device. The described elements can be implemented in handheld devices as well as in point-of-sale systems and other stationary or installed systems and devices. The disclosed devices and systems may be beneficial in imagers and readers with limited power capabilities such as USB powered devices, or battery powered devices, among others.

Figure 1:
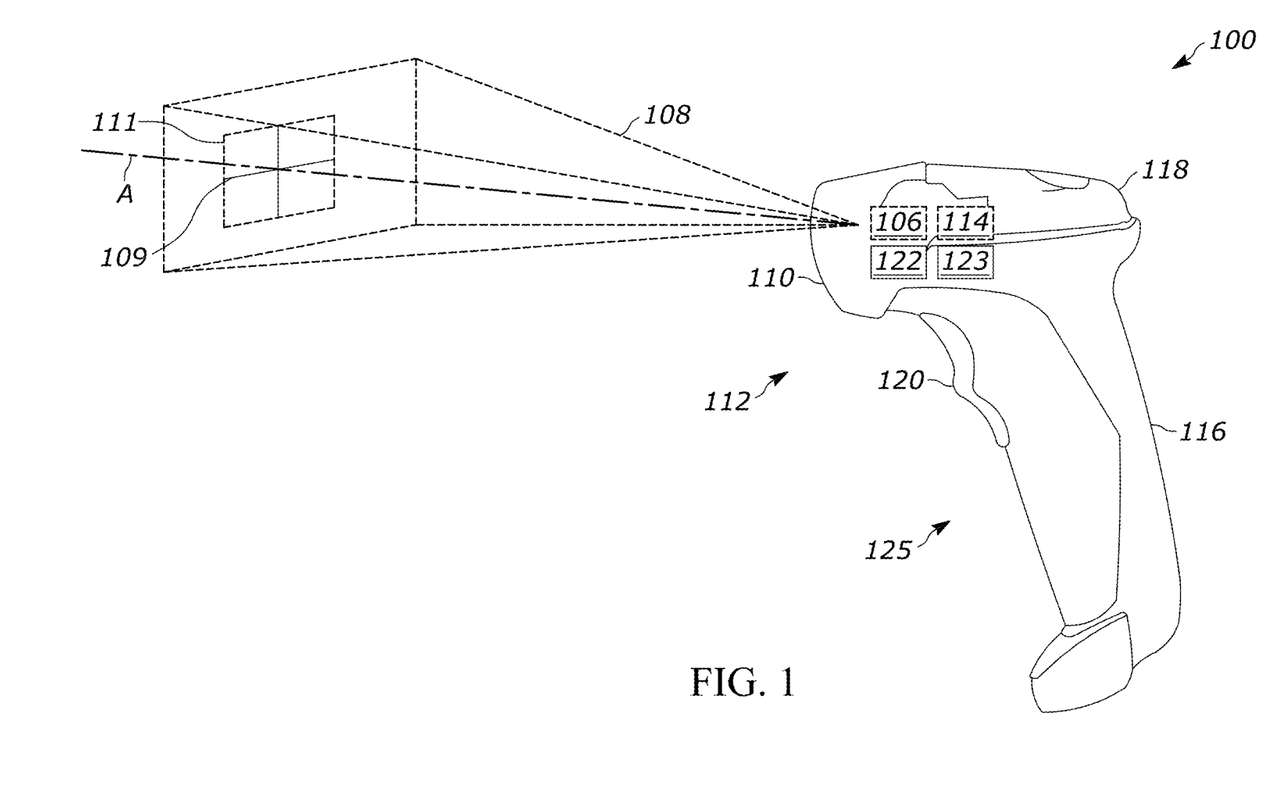
FIG. 1 is a perspective view of an example scanning device, in accordance with various embodiments of the present invention.

FIG. 1 is a perspective view of an example imaging device 100, in accordance with various embodiments of the present invention. The example imaging device 100 includes an example housing 102 that includes a generally elongated handle or lower handgrip portion 116, and an upper body portion 118 having the front side 112 at which the front-facing opening or window 110 is located. The cross-sectional dimensions and overall size of the handgrip portion 116 are such that the example imaging device 100 can be conveniently held in an operator's hand during operation. The front-facing opening or window 110 is configured to face generally away from a user when the user has the example imaging device 100 in a handheld position. The portions 116 and 118 may be constructed of a lightweight, resilient, shock-resistant, self-supporting material, such as a synthetic plastic material. The housing 102 may be injection molded, but can also be vacuum-formed or blow-molded to form a thin hollow shell which bounds an interior space whose volume is sufficient to contain the various components of the handheld scanner device 100. Although the housing 102 is illustrated as a portable, point-of-transaction, gun-shaped, handheld housing, any other configuration including a hands-free configuration could be used.

The example imaging device 100 also includes an imaging assembly 106 that is disposed within the example housing 102. The imaging assembly 106 captures image data representing a target in a field of view 108 (FOV) at least partially defined by a front-facing opening or window 110 (also referenced herein as an "optical window") on a front side 112 of the example imaging device 100. The example imaging device 100 also includes an imaging shutter 122 configured to actuate and expose the imaging assembly 106 to an external environment, a portion of which is included in the FOV 108. The FOV 108 includes a central region 111 that includes a subregion of the FOV 108. The central region 111 is generally around a central axis A of the FOV 108. The central axis A defines, or is generally along, a center of the FOV through a plurality of cross-sections of the FOV, each cross-section being orthogonal to the central axis along a distance from the window 110. The central region 111 may be between 30% and 60% of a cross-sectional area of the FOV 108, may be between 20% and 70% of the FOV 108, between 45% and 5% of the FOV 108, may be greater than 20%, greater than 30%, or greater than 40%, or less than 70%, less than 60% or less than 50% of the FOV 108. As described further herein, the illumination may be provided by one or more illumination sources and focused into the central region 111 to provide more illumination to the central region than to portions of the FOV 108 outside of the central region.

As used herein, a "working distance" for a barcode reader or imager may be taken as the distances from the reader in which the barcode reader is designed to, or is able to, image and decode barcodes or perform machine vision processes. Additionally, as a person of skill in the art would recognize, the cross-sections of the FOV may be taken at various distances from the barcode reader, and each cross-section of the FOV will have a respective height and width in the FOV along a working distance for a respective barcode reader.

More specifically, the example imaging device 100 may also include a manually actuatable trigger 120 that is mounted in a moving relationship on the handgrip portion 116 in a forward-facing region of the handgrip portion 116 that is configured to actuate the imaging shutter 122. An operator's finger can be used to actuate (e.g., depress) the trigger 120 once a target falls within the imaging FOV 108, thereby causing the imaging shutter 122 to actuate (e.g., open) and expose the imaging assembly 106 to capture an image of the target. As a result of actuating the trigger 120, the example imaging device 100 may generate an aiming pattern 109, which may visually indicate the FOV 108 of the example imaging device 100 for the operator utilizing the device 100, and may more specifically indicate a region within the FOV 108 (e.g., the central region 111) where the device 100 may successfully scan and/or otherwise interpret an indicia within the FOV 108. The aiming pattern 109 may more specifically be indicative of the central region of the FOV 108 to provide guidance to a user to position an object or target in the central region 111 for performing scanning and barcode reading. In certain instances, the imaging assembly 106 may be configured to capture the image during an image capture period, during which, the imaging shutter 122 actuates and exposes the imaging assembly 106 to the external environment. The example imaging device 100 also includes an indicia decoder 114 in communication with the imaging assembly 106, and configured to receive image data comprising the image and decode an indicia represented in the image data.

The example imaging device 100 also includes an illumination assembly 123 configured to emit illumination. Generally speaking, the illumination assembly 123 may be configured to output illumination in response to receiving a forward voltage from a battery (not shown) as a result of the operator actuating the trigger 120. The illumination assembly 123 may be or include a light emitting diode (LED) that may be configured to output illumination in a variety of wavelengths or patterns. For example, the illumination assembly 123 may generate the aiming pattern 109. Regardless, the illumination assembly 123 may be and/or include a single LED, multiple LEDs configured in series, multiple LEDs configured in parallel, multiple LEDs configured in series/parallel, and/or any other suitable number and/or configuration of LEDs or illumination sources or combinations thereof.

In specific examples, the illumination assembly 123 may include a plurality of LEDs for providing illumination, and associated illumination optics optically coupled to the LEDs to provide an illumination field to the FOV 108. The illumination optics may include one or more free-form lenses that provide more illumination to the central region 111 than to portions of the FOV 108 outside of the central region 111. For example, the LEDs and illumination optics may be configured to provide an illumination field with an average illumination intensity in the central region 111 that is at least 20% greater than an average illumination intensity of the illumination field outside of the central region 111. In other examples, the illumination optics and LEDs may be configured to provide an illumination intensity in the central region that is less than 50% greater than an average illumination intensity of the illumination field outside of the central region 111 of the FOV 108. In specific implementations, the amount of illumination intensity in the central region 111, as compared to regions outside of the central region 111, may vary at different distances from the window 110. For example, the illumination optics and LEDs may provide an illumination field with an average illumination intensity in the central region that is at least 25% greater than the illumination intensity outside of the central region at distances of 2 to 28 inches from the window 110. The ratio of illumination intensity in the central region to illumination intensity outside of the central region may vary at distances further from the window 110. The distances from the window 110 may be taken along the central axis A for consistency. In other examples, the distance of the illumination field may be considered as a straight line from a target object to an imaging sensor or camera, the window 110, or to another element of the imaging reader 100. The ratios and percentages of increased illumination intensity in the central region may be considered to be described for various distances from a barcode reader, and specifically, for any working distances for a given barcode reader. In implementations, the ratio of the average illumination intensity in the central region to the average illumination intensity in the field-of-view outside of the central region may vary by no more than 50% along a working distance of the imaging assembly.

Figure 2:
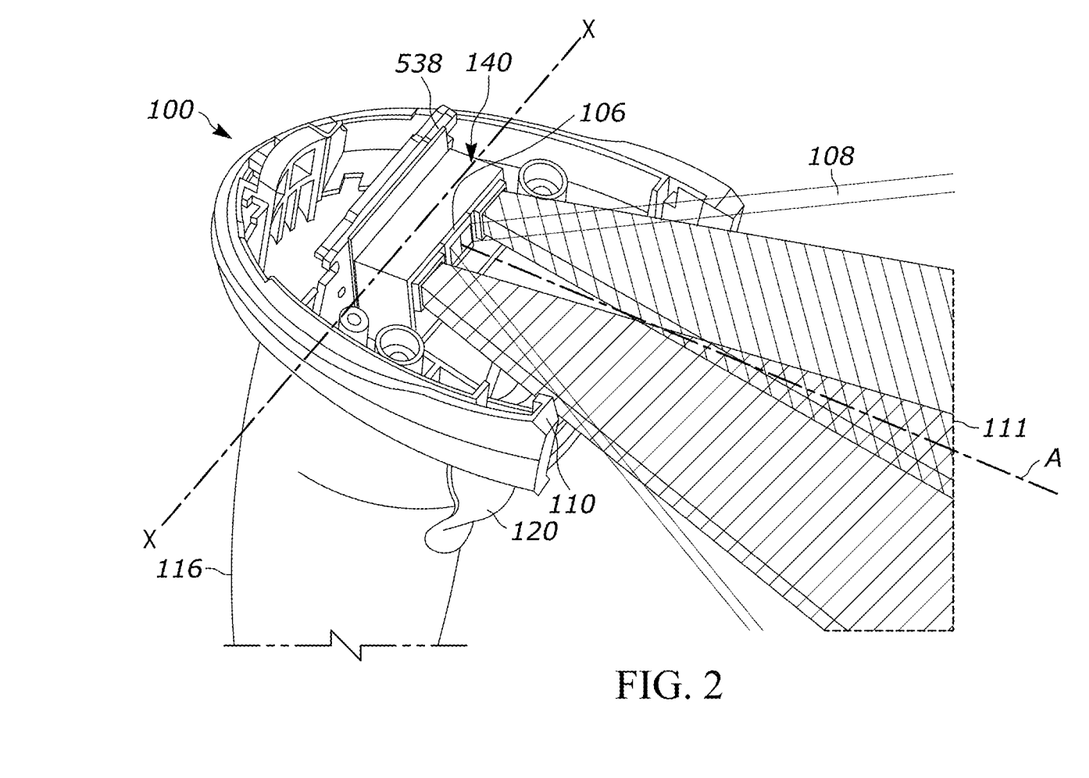
FIG. 2 is a perspective view of the reader of FIG. 1, with its top removed to illustrate components of imaging and illumination assemblies of the reader, in accordance with embodiments of the present invention.
Figure 3:
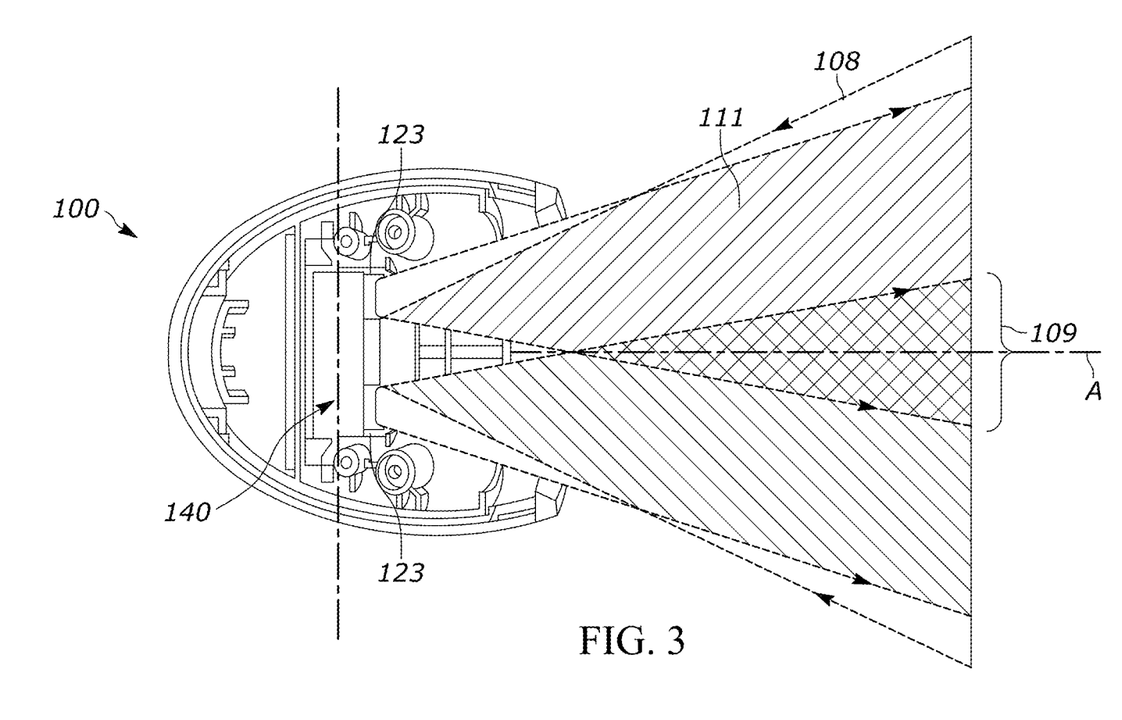
FIG. 3 is a top plan view of the reader of FIG. 2, in accordance with embodiments of the present invention.
Figure 4:
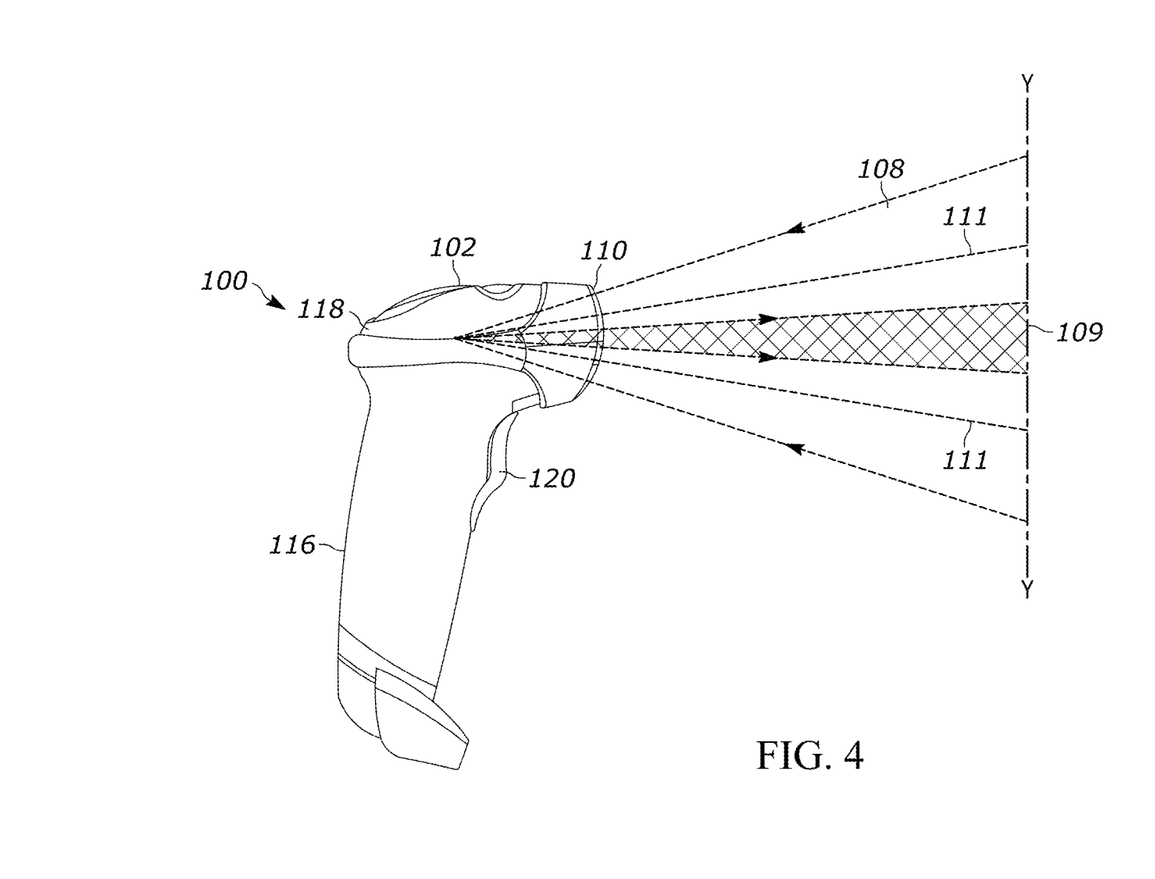
FIG. 4 is a side elevational view of the reader of FIG. 2, in accordance with embodiments of the present invention.
Figure 5:
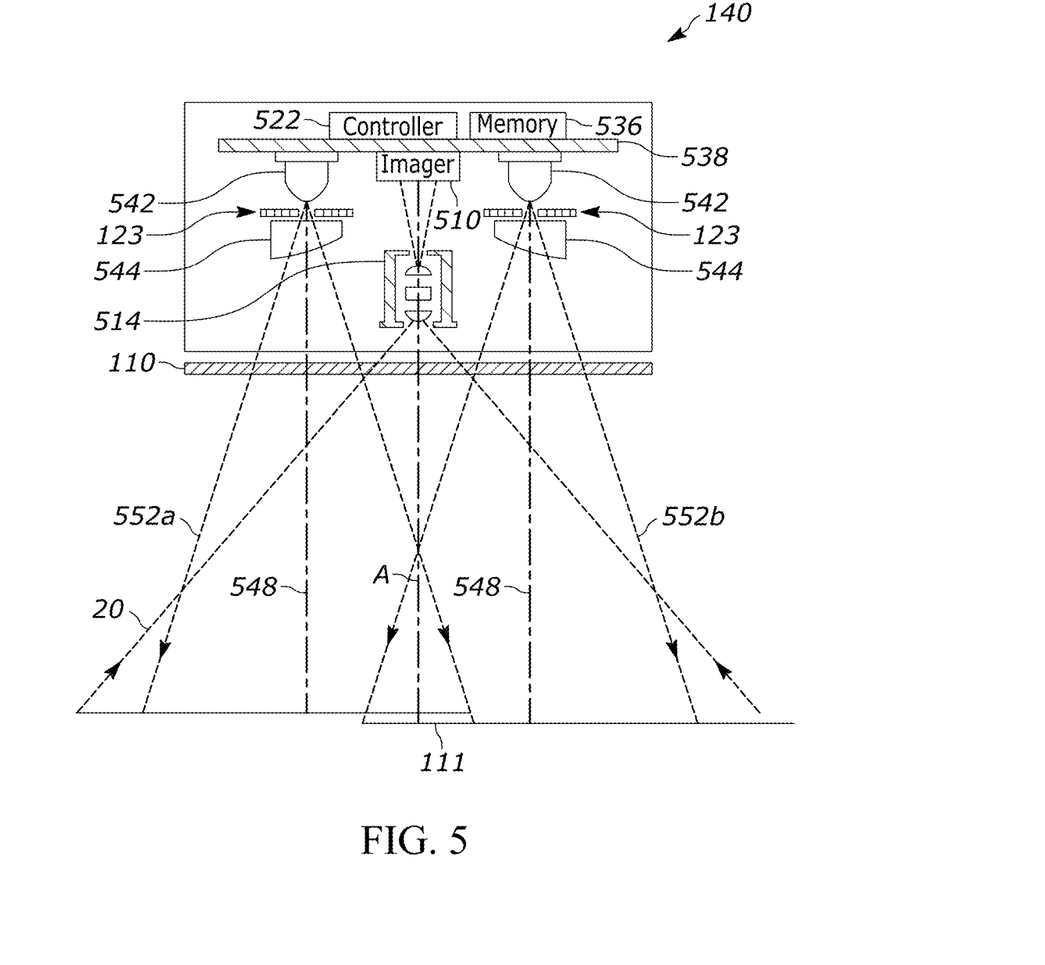
FIG. 5 is a diagrammatic view of components of the imaging and illumination assemblies of the reader of FIG. 1, in accordance with embodiments of the present invention.

FIGS. 2-3 depict the reader 100 with a top of the housing 102 removed and exposing the module 140 therein. FIG. 4 is a side perspective of the reader 100 illustrating the FOV 108, central region 111, and aiming pattern 109. FIG. 5 depicts a block diagram of example elements of the reader 100 for providing improved illumination for low-light environments, and limited power readers, as described herein. FIGS. 2-5 will collectively be referenced for clarity and completeness of the following description. As best shown in FIG. 5, the module 140 includes the imaging assembly 106, and an imaging lens assembly 512 mounted in a tubular holder 514 that has a circular imaging aperture 516. In examples, the imager 510 may be a two-dimensional, charge coupled device (CCD) array or a complementary metal oxide semiconductor (CMOS) array of cells or sensors having either a global or a rolling shutter. The imager 510 and imaging lens 512 are preferably aligned along a centerline or the optical imaging axis A generally centrally located within the upper body portion 118.

In operation, the imaging system captures return light passing through the window 110 along the imaging axis A centered in the imaging FOV 108 of the imaging lens assembly 512 from a target located in a range of working distances away from the window 110. The imager 510 is advantageously positioned closer to a rear wall of the upper body portion 118 than to a front of the housing in order to enlarge the imaging FOV 108 in the near range of working distances close to the reader 100. The imaging lens 532 focuses images of various focal planes in the FOV 108 onto the imager 510. The FOV 108 may generally be rectangular and extends along the illustrated mutually orthogonal, horizontal (X-X) and vertical (Y-Y) axes that are generally perpendicular to the central imaging axis A. The sensors produce electrical signals corresponding to a two-dimensional array of pixel information for an image of the target. The electrical signals are processed by a controller or programmed microprocessor 522 into data indicative of the target being read. The controller 522 is connected to a memory 536 for data retrieval and storage. The controller 522 and the memory 536 are mounted on a printed circuit board 538, which need not be mounted in the module 140 as shown, but could be mounted remotely from the module 140.

The imaging system is capable of acquiring a full image of the target under various lighting conditions. A non-illustrated aiming system may also be mounted on the module 140 to provide the aiming pattern 109 indicative of the FOV 108, or more specifically, of the central region 11 of the FOV 108.

In the illustrated example, the illumination assembly 123 includes a pair of illumination light sources 542 supported by the module 40, and offset from the imager 510. The illumination light sources 542 may each include one or more LEDs, black body radiation sources, or another sources of light or illumination. The illumination assembly 123 is operative for projecting illumination into the FOV 108 onto targets.

The illumination light sources 542 are spaced apart along the horizontal axis (X-X) at opposite sides of the imaging sensor 510. The illumination light sources 542 may be mounted on the circuit board 538. One or more illumination optical elements 544 are then disposed to receive the illumination from the illumination sources 542, and further to generate an illumination field in the FOV 108 of the reader 100. The illumination optical elements 544 may include one or more lenses. For example, the illumination optical element 544 coupled to each LED 542 may include a freeform lens that has surfaces designed to provide an illumination field to the FOV 108 with more illumination in the central region 111 of the FOV 108 that to other portions of the FOV 108, as described further herein. In examples, the illumination optical element 544 may include one or more collimators, or microlens arrays. Each LED 542 and lens 544 may be centered and lie along a respective illumination axis 548.

In accordance with this disclosure, the described illumination assembly 123 enhances the visibility of objects in the FOV 108, and specifically in the central region 111 of the FOV, in low light environments, or at far distances from the window 110. Additionally, the described resultant illumination field allows for improved illumination of targets for imaging systems and readers with limited power capabilities.

Figure 6:
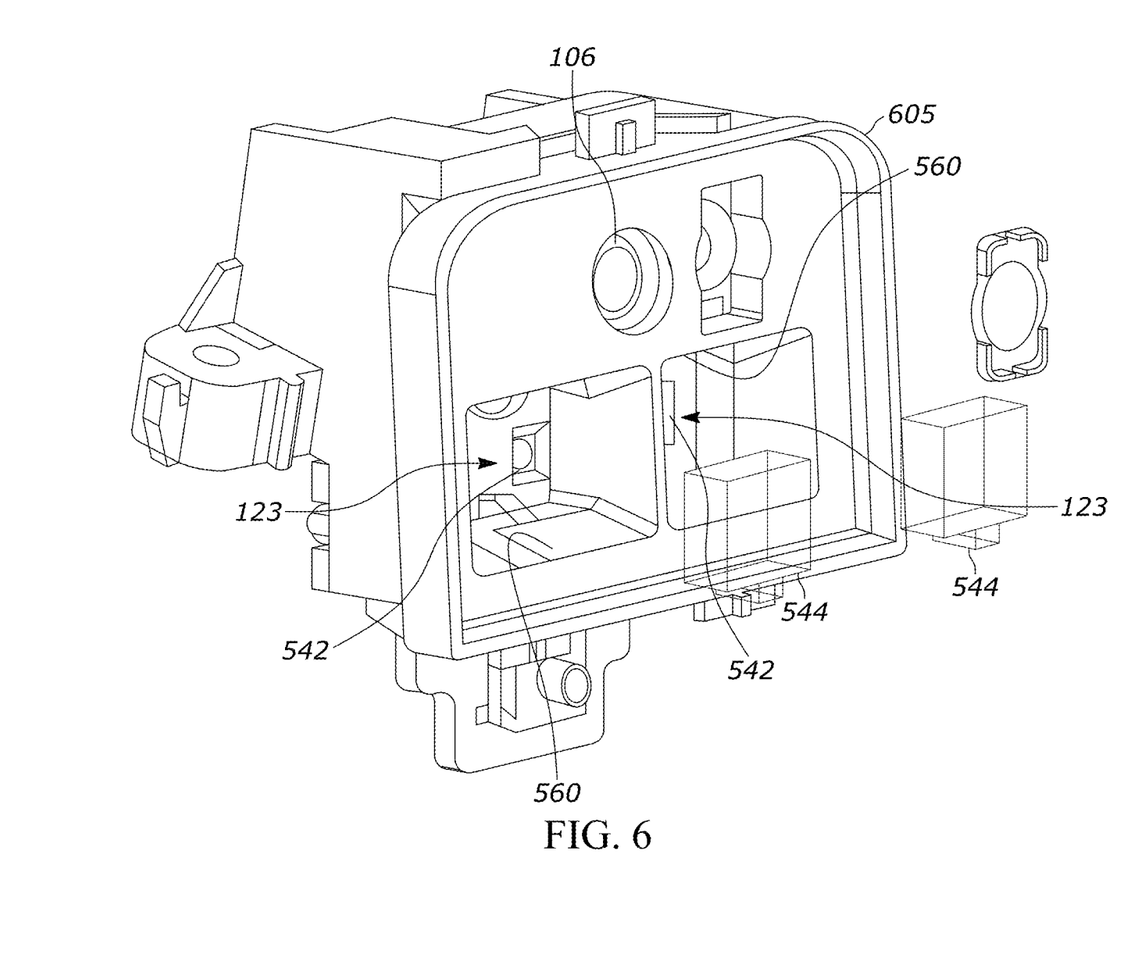
FIG. 6 illustrates an example internal frame for housing and mounting elements of the imaging and illumination assemblies of FIGS. 1-5, in accordance with embodiments of the present invention.

FIG. 6 illustrates an example internal frame 605 for housing and/or mounting elements of the imaging assembly 106, and illumination assembly 123, and may further include elements of the indicia decoder 114 and any processors/memory required for performing the functions described herein. The illumination light sources 542 are disposed inside of the internal frame 605, and illumination optics as the lenses 544 are fixed into mounts 560 in positions relative to the illumination light sources 542 to receive the light from the illumination light sources 542. The lenses 544 may be freeform lenses that have surfaces configured to shape the illumination to form an illumination field in the FOV according to a desired illumination profile in the central region 111 and FOV 108 overall. In the example of FIG. 6, the illumination sources 542 of the illumination assembly 123 are disposed adjacent to each other, and offset from the imaging assembly 106.

Figure 7:
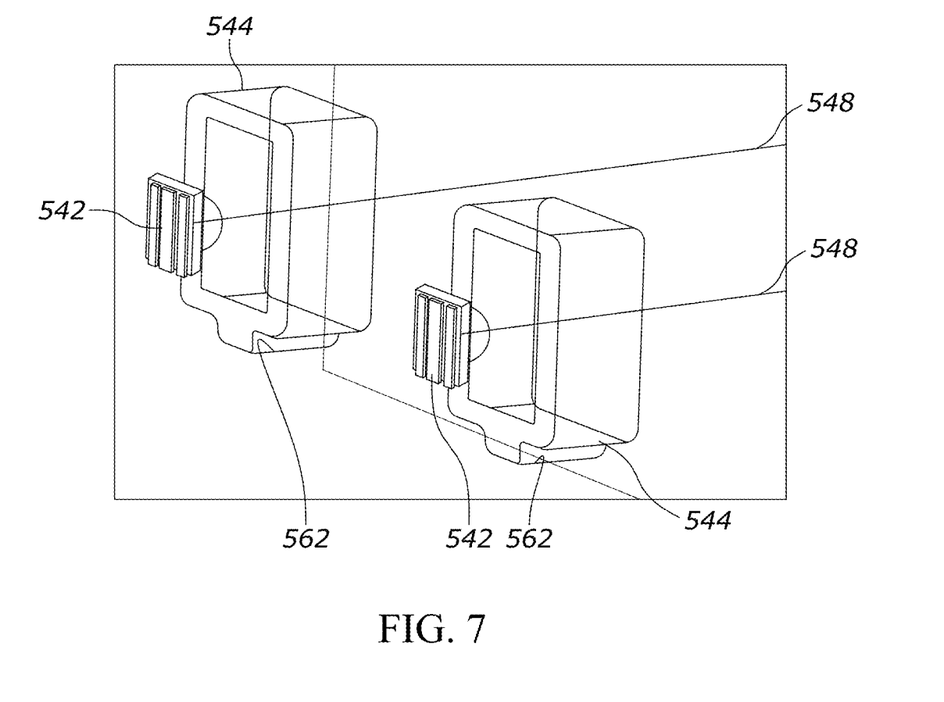
FIG. 7 is a perspective view of a pair of illumination light sources and illumination optics disposed along illumination axes, in accordance with embodiments of the present invention.
Figure 8:
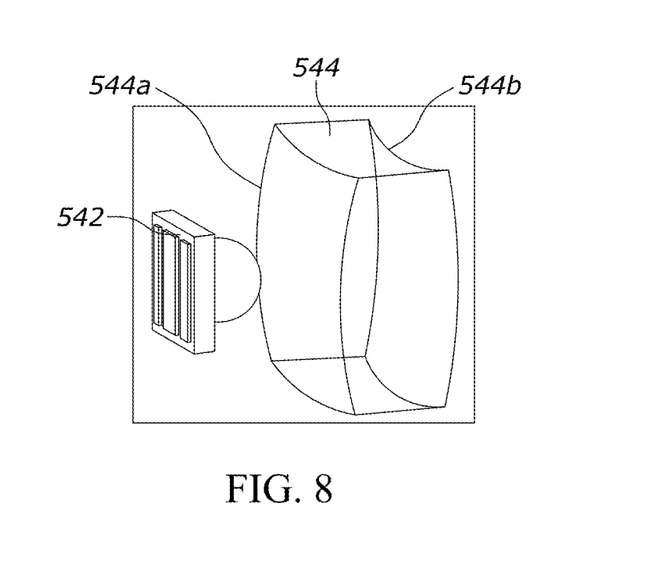
FIG. 8 is a perspective view of an illumination source and a lens structure of an associated illumination optical element, in accordance with embodiments of the present invention.

FIG. 7 is a perspective view of a pair of illumination light sources 542 as LEDs, disposed along respective illumination axes 548, and illumination optics 544 as freeform lenses 544 disposed along the illumination axes 548 to receive illumination light from the illumination light sources 542. Each illumination optic 544 includes a mounting portion 562 for positioning each illumination optic 544 into the frame 605 of FIG. 6. The mounting portion 562 allows for the optics 544 to be properly positioned at relative distances and orthogonal positions along each illumination axis 548 to provide a desired illumination field to the central region 111 and FOV 108 of the reader 100. FIG. 8 is a perspective view of an illumination source 542 a lens structure of an associated illumination optical element 544. In the provided example, the illumination optical element 544 is a freeform lens with a first concave surface 544a and a second convex surface 544b to provide a desired illumination field. In examples, the freeform lenses may be fabricated to have various curved surfaces to manipulate the light into desired illumination fields to concentrate light along the central axis, or around an aiming location. In examples, a single optical element may be used to provide the concentrated light into the central region as described. In the provided examples of FIGS. 5-7, two illumination sources with respective illumination optical elements are implemented to provide an overlap of illumination in the central region 111 to provide increased illumination in the central region 111 as compared to parts of the FOV 108 outside of the central region 111.

Figure 9:
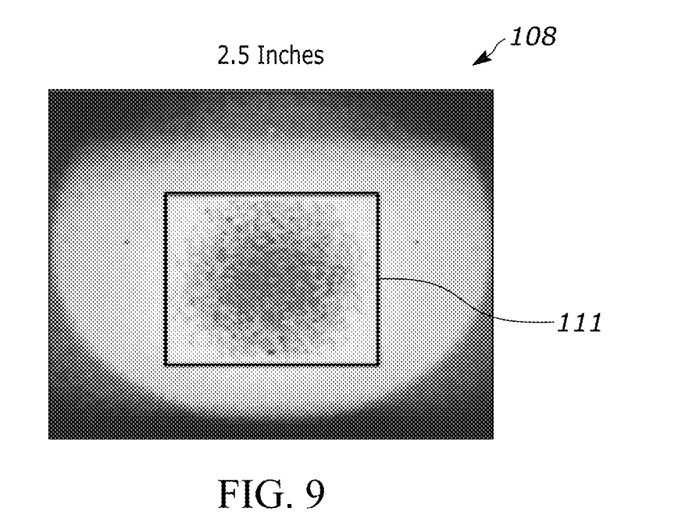
FIG. 9 is a plot of illumination field intensity of a field of view of a barcode reader with freeform lenses generating an illumination field with increased intensity in the central region at 2.5 inches away from a barcode reader, in accordance with embodiments of the present invention.
Figure 10:
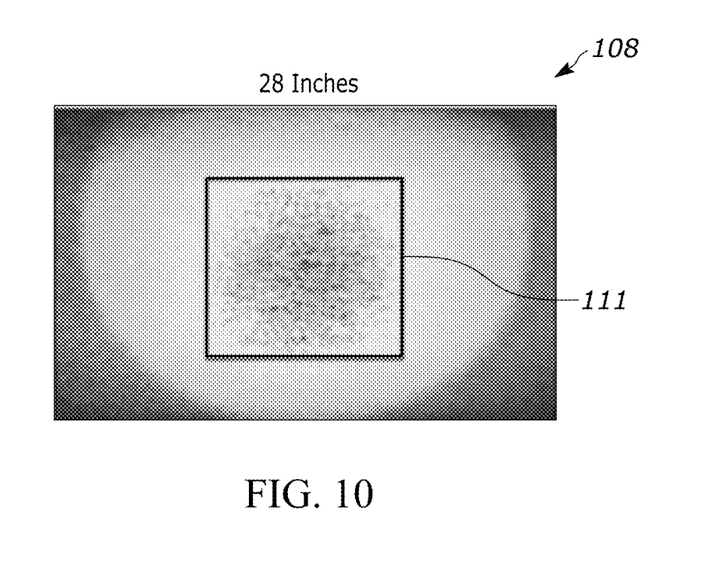
FIG. 10 is a plots of illumination field intensity of a field of view of a barcode reader with freeform lenses generating an illumination field with increased intensity in the central region at 28 inches away from a barcode reader, in accordance with embodiments of the present invention.

FIGS. 9 and 10 are plots of illumination field intensity of a FOV of a barcode reader with freeform lenses generating an illumination field with increased intensity in the central region 111. The illumination fields of FIGS. 9 and 10 are representative of fields at two different cross-sections of the FOV of a barcode reader. The illumination field presented in FIG. 9 was taken at 2.5 inches away from the barcode reader, while the illumination field of FIG. 10 was taken at 28 inches from the barcode reader. Both of the illumination fields have an average illumination intensity of 400 lumens/steradian in the central region 111, and an average illumination intensity of 270 lumens/steradian outside of the central region 111, in the FOV 108. The illumination fields generally maintain their shape at various distances from the barcode reader. The illumination in the central region 111 may generally be more uniform as compared to illumination systems that do not use the described freeform lens configuration. In the provided images, the illumination intensity in the central region was approximately between 30% and 40% greater than in the regions outside of the central region 111.

The above description may refer to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium," "computer-readable media," "computer-readable storage medium," and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging system, the imaging system comprising:
an imaging assembly with one or more imaging sensors, the imaging assembly configured to capture images of one or more objects of an environment in a field of view of the imaging assembly, the one or more imaging sensors including a two-dimensional (2D) imager, the field of view further having a height and width;

an aiming assembly configured to provide an aiming pattern in the field of view of the imaging assembly; and an illumination assembly with one or more illumination sources and an illumination optical element configured to provide illumination to a central region of the field of view of the imaging assembly, the central region being between 30% to 60% of a cross-sectional area of the field-of-view, wherein the average illumination intensity inside of the central region is at least 20% greater than an average illumination intensity in the field-of-view outside of the central region, wherein the illumination optical element is configured to receive illumination from the one or more illumination sources and generate an illumination field in the field of view of the imaging assembly.

2. The imaging system of claim 1, wherein the central region comprises a region of space around a central axis of the field of view, the central axis defining a center of the field of view along a plurality of cross-sections of the field of view, the cross-sections being orthogonal to the central axis.

3. The imaging system of claim 1, wherein the illumination field has an average illumination intensity in the central region that is less than 50% greater than an average illumination of the illumination field outside of the central region.

4. The imaging system of claim 1, wherein the illumination field the average light distribution in the central region is greater than 25% higher than the light distribution outside of the central region between 2 and 28 inches from the imaging system along the central axis.

5. The imaging system of claim 1, wherein the central region is between 45% and 55% of the cross-sectional area of the field-of-view along a working distance of the imaging assembly.

6. The imaging system of claim 1, wherein the ratio of the average illumination intensity in the central region to the average illumination intensity in the field-of-view outside of the central region varies by no more than 50% along a working distance of the imaging assembly.

7. The imaging system of claim 1, wherein the illumination optical element comprises at least one of a freeform lens, a collimator, and a microlens array.

8. The imaging system of claim 1, wherein the aiming assembly is configured to provide the aiming pattern along the central axis of the field of view.

9. The imaging system of claim 1, wherein the aiming pattern is indicative of the central region.

10. A barcode reader comprising:

a housing having a handgrip portion and an upper body portion;

an imaging module positioned within the upper body portion, the imaging module including:

an imaging assembly having one or more imaging sensors, the imaging assembly configured to capture images of one or more objects of an environment in a field of view of the imaging assembly, the one or more imaging sensors including a two-dimensional (2D) imager;

an aiming assembly configured to provide an aiming pattern in the field of view of the imaging assembly;

an illumination assembly with one or more illumination sources and an illumination optical element configured to provide illumination to a central region of the field of view of the imaging assembly, the central region being between 30% to 60% of a cross-sectional area of the field-of-view, wherein the average illumination intensity inside of the central region is at least 20% greater than an average illumination intensity in the field-of-view outside of the central region, wherein the illumination optical element is configured to receive illumination from the one or more illumination sources and generate an illumination field in the field of view of the imaging assembly.

11. The barcode reader of claim 10, wherein the central region comprises a region of space around a central axis of the field of view, the central axis defining a center of the field of view along a plurality of cross-sections of the field of view, the cross-sections being orthogonal to the central axis.

12. The barcode reader of claim 10, wherein the illumination field has an average illumination intensity in the central region that is at least 20% greater than an average illumination of the illumination field outside of the central region.

13. The barcode reader of claim 10, wherein the illumination field has an average illumination intensity in the central region that is less than 50% greater than an average illumination of the illumination field outside of the central region.

14. The barcode reader of claim 10, wherein an average light distribution in the central region is greater than 25% higher than a light distribution outside of the central region between 2 and 28 inches from the imaging system along the central axis.

15. The barcode reader of claim 10, wherein the illumination optical element comprises one or more of a freeform lens, a collimator, and a microlens array.

16. The barcode reader of claim 10, wherein the imaging sensor comprises a two-dimensional imager.

17. The barcode reader of claim 10, wherein the aiming assembly is configured to provide the aiming pattern along the central axis of the field of view.

18. The barcode reader of claim 10, wherein the aiming pattern is indicative of the central region.

* * * * *